United States Patent
Obrecht et al.

(10) Patent No.: US 7,134,466 B2
(45) Date of Patent: Nov. 14, 2006

(54) CROSSLINKED RUBBER PARTICLES MODIFIED BY AMINO(METH)ACRYLATE GROUPS

(75) Inventors: Werner Obrecht, Moers (DE); Burkhard Köhler, Leverkusen (DE); Winfried Jeske, Burscheid (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/778,434

(22) Filed: Feb. 13, 2004

(65) Prior Publication Data

US 2004/0166317 A1    Aug. 26, 2004

(30) Foreign Application Priority Data

Feb. 20, 2003    (DE) ................. 103 07 139

(51) Int. Cl.
*C08L 19/00*    (2006.01)
*C08F 279/02*    (2006.01)

(52) U.S. Cl. ........................ 152/151; 525/77
(58) Field of Classification Search ............. 525/293, 525/77; 152/151
See application file for complete search history.

(56) References Cited

U.S. PATENT DOCUMENTS 4,714,532 A    12/1987    Guioth et al. ............ 204/181.7

6,399,706 B1    6/2002    Obrecht et al. ............ 525/191

FOREIGN PATENT DOCUMENTS

EP    0 473 972    3/1992
EP    1 152 030    11/2001

OTHER PUBLICATIONS

Fischer et al., CAPLUS AN 1995:85665, abstracting DE 4234296, Apr. 1994.*

* cited by examiner

*Primary Examiner*—Jeffrey Mullis
(74) *Attorney, Agent, or Firm*—Jennifer R. Seng

(57) ABSTRACT

The present invention relates to crosslinked rubber particles modified by secondary amino-(meth)-acrylate groups, a process for their production, their use for the production of rubber vulcanizates or rubber molded bodies of all kinds and also the rubber vulcanizates or rubber molded bodies that can be obtained from the rubber particles.

3 Claims, No Drawings

CROSSLINKED RUBBER PARTICLES MODIFIED BY AMINO(METH)ACRYLATE GROUPS

FIELD OF THE INVENTION

The present invention relates to crosslinked rubber particles modified by secondary amino-(meth)-acrylate groups, a process for their production, their use for the production of rubber vulcanizates or rubber molded bodies of all kinds and also the rubber vulcanizates or rubber molded bodies that can be obtained from the rubber particles.

BACKGROUND OF THE INVENTION

The use of crosslinked rubber particles (so-called rubber gels) as fillers with a reinforcing action in combination with un-crosslinked rubbers for the production of vulcanizates is known. The use of such rubber gels as fillers for the production of rubber vulcanizates improves in particular the tensile modulus at 300% elongation, the elongation at break, the tensile strength and also the abrasion of the vulcanizates and the molded bodies produced from them e.g. tires. In addition, vulcanizates to which rubber gels based on polybutadiene are added, have low impact resilience (low hysteresis losses) over a wide temperature range. Rubber gels based on styrene/butadiene rubbers are characterized by low impact resilience at room temperature (good Wet-slip behavior) and high impact resilience at 70° C. (low rolling resistance).

As a result of the improvements in properties achieved by using rubber gels for the production of vulcanizates or rubber molded bodies, there has been no shortage of attempts to continuously improve and optimize the rubber gels known, in order to increase still further their physical effect on the production of vulcanizates and rubber molded bodies.

The rubber molded bodies or rubber vulcanizates produced with the crosslinked rubber particles according to the present invention, modified by secondary amino-(meth)-acrylate groups, are have improved mechanical properties, an improvement in the product of the tensile modulus at 300% elongation and elongation at break ($\sigma_{300} \times \epsilon_b$), when multifunctional sulfonyl azides are used for crosslinking in addition to the conventional chemicals for sulfur crosslinking, and that it is possible in mixtures containing silica, to reduce the quantity of bis-(triethoxysilyl-propyl-3)-tetrasulfide by using multifunctional sulfonyl azides without losses in the product $\sigma_{300} \times \epsilon_b$.

The present invention improves the physical properties described of the blends or vulcanizates and molded bodies produced with rubber gels, in particular the product of the tensile modulus at 300% elongation and the elongation at break ($\sigma_{300} \times \epsilon_b$) and also to ensure that rubber blends containing gel and silica and the vulcanizates produced from them can be accessed economically, are toxicologically safe and also that good coupling of the rubber gels and the silicas to the rubber matrix is assured, in combination with rapid and economical vulcanization.

It was found, that the rubber gels according to the invention described in more detail below, which are modified by secondary amino-(meth)-acrylate groups, help to achieve the improved physical properties described, as it was found, surprisingly, that with the rubber gels modified according to the present invention, it is even possible, when using light fillers such as silicas, to reduce the quantity of silane coupling agents considerably, without having a negative impact on the physical properties of the vulcanizates.

SUMMARY OF THE INVENTION

The present invention provides crosslinked rubber particles modified with secondary amino-(meth)-acrylate groups, which have a particle diameter of 5 to 1000 nm, a swelling index in toluene of 1 to 50, a gel content of 70 to 100 wt. % and a quantity of secondary amino-(meth)-acrylate groups of 0.5 to 20 wt. %, in relation to 100 wt. % rubber gel in each case.

DETAILED DESCRIPTION OF THE INVENTION

Preferred rubber particles according to the present invention are those that have a particle diameter of 10 to 500 nm, preferably 20 to 400 nm, a swelling index in toluene of 1 to 25, preferably 1 to 15, a gel content of 80 to 100, preferably 90 to 100 wt. % and a quantity of secondary amino-(meth)-acrylate groups of 0.5 to 10, preferably1 to 5 wt. %.

Secondary amino-(meth)-acrylate groups that are derived from secondary amino-(meth)-acrylic acid esters of the general formula (I)

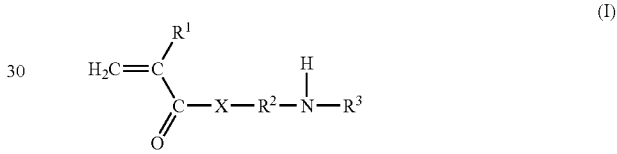

in which $R^1$ stands for hydrogen or methyl

X stands for —O— or —NH—, $R^2$ stands for a $C_2$— to $C_6$-alkylene group, preferably for —$CH_2$—$CH_2$— and $R^3$ stands for a $C_1$- to $C_{18}$-alkyl group, preferably for tert.-butyl, or a $C_7$- to $C_{20}$-aralkyl- or arylalkyl group or a $C_6$- to $C_{10}$-alkyl group and that are obtained by copolymerization or by reaction with rubber gels known to the person skilled in the art, are possible secondary amino-(meth)-acrylate groups that are present as modifying groupings in the rubber gels according to the present invention.

Those sec-amino-(meth)-acrylic acid esters, in which $R^1$ stands for methyl,

X stands for an oxygen atom, $R^2$ stands for a 1,2-ethylidene group and $R^3$ stands for tert.-butyl are preferred.

The following are named as suitable secondary amino-(meth)-acrylic acid esters of the above formula:

2-tert-butylamino ethylmethacrylate and 2-tert-butylamino ethylmethacrylamide, 2-tert-butylamino ethylmethacrylate being preferred.

The crosslinked modified rubber gels include those based on the following rubbers:

BR: polybutadiene

ABR: butadiene/acrylic acid-$C_{1-4}$-alkyl ester copolymers

IR: polyisoprene

SBR: styrene-butadiene copolymers with styrene contents of 1–60, preferably 5–50 wt. %, X-SBR: carboxylated styrene butadiene copolymers
FKM: fluorine rubber
ACM: acrylate rubber
NBR: butadiene-acrylonitrile copolymers with acrylonitrile contents of 5–60, preferably 10–50 wt. %
X-NBR: carboxylated nitrile rubbers
CR: polychloroprene
IIR: isobutylene/isoprene copolymers with isoprene contents of 0.5–10 wt. %
BIIR: brominated isobutylene/isoprene copolymers with bromine contents of 0.1–10 wt. %
CIIR: chlorinated isobutylene/isoprene copolymers with a chlorine content of 0.1–10 wt. %
HNBR: partially- and fully-hydrogenated nitrile rubbers
EPDM: ethylene-propylene-diene copolymers
EAM: ethylene/acrylate copolymers
EVM: ethylene/vinylacetate copolymers
CO and ECO: epichlorohydrin rubbers
Q: silicon rubbers
AU: polyester urethane polymers
EU: polyether urethane polymers
NR: natural rubber Rubber gels based on BR, SBR, NBR, CR, IR and NR are preferred. Rubber gels based on BR, SBR and NBR are more preferred.

The particle diameters given for the rubber particles according to the present invention are measured by ultracentrifugation (W. Scholtan, H. Lange, "Bestimmung der Teilchengrößenverteilung von Latices mit der Ultrazentrifuge", Kolloid-Zeitschrift und Zeitschrift für Polymere (1972) Vol. 250, p. 782. The diameters are given according to DIN 53 206, the median- or central value $d_{50}$ being defined as the diameter, above and below which half of all particle sizes lies. The median value corresponds to the diameter at which the empirical formula reaches the value 0.5.

The gel content and swelling index of the rubber gels are measured on a dry sample, by swelling at room temperature 250 mg of the rubber gel in 25 ml toluene for 24 hours whilst shaking. The gel is centrifuged off at 20,000 rpm and weighed wet, then dried at 70° C. to constant weight and weighed again. The gel content is calculated from the quantity of dried polymer in relation to the polymer used and given in wt. %. The swelling index $Q_i$ is calculated from the ratio of wet weight of the gel to dry weight of the gel.

The quantity of secondary amino-acrylate groups is measured by elementary analysis by means of the nitrogen content.

The present invention further provides the production of the crosslinked rubber particles (gels) modified by secondary amino-(meth)-acrylate groups. The gel is substantially produced by the following process.

I. In the direct polymerization process, ethylenically unsaturated monomers such as styrene and acrylonitrile are copolymerized with conjugated dienes such as butadiene and/or isoprene with crosslinkers based on multivinyl-containing monomers and the amino-(meth)-acrylate.

II. In the subsequent modification, the modified rubber gels are produced by crosslinking the rubbers on which the gels are based, preferably in aqueous dispersion, in the known way and after achieving the desired degree of crosslinking, reacting or modifying the rubber gels obtained with the secondary amino-(meth)-acrylic acid esters of the formula (I) described previously.

When producing the crosslinked rubber particles modified by amino(meth)acrylate groups by direct polymerization the following monomer mixtures are used:

A: dienes such as butadiene and isoprene
B: monovinyl compounds such as styrene, acrylonitrile, α-methyl styrene and p-methyl styrene
C: multivinyl-containing monomers such as divinyl benzene, diisopropenyl benzene, divinyl ether, divinyl sulfone, diallyl phthalate, triallyl cyanurate, triallyl isocyanurate, N,N'-m-phenylene maleindiimide, triallyl trimellitate, acrylates and methacrylates of multifunctional 2- to 4-valent alcohols such as ethylene glycol, propane diol-1,2, hexane diol, polyethylene glycol, with 2–20, preferably 2–8 oxymethylene units, neopentyl glycol, bisphenol A, glycerine, trimethylol propane, pentaerythritol, sorbitol and unsaturated polyesters based on aliphatic diols and polyols as well as maleic acid, fumaric acid and/or itaconic acid
D: amino(meth)acrylate.

The following quantities of the stated monomers are used, in relation to 100 parts by weight of monomers in each case.
A: 10–90 parts by weight
B: 0–70 parts by weight
C: 0.5–20 parts by weight
D: 0.5–20, preferably 0.5–10, more preferably 1.5 parts by weight.

The monomers are copolymerized in the stated weight ratios, the preferred polymerization process being radical aqueous emulsion polymerization. Polymerization is carried out in batches or continuously.

Polymerization is carried out at normal pressure and, preferably in the presence of butadiene, at increased pressure.

The polymerization temperature is generally 0 to 100° C. Higher temperatures up to 130° C. are possible. The polymerization temperatures depend particularly on the type of radical former used and the pressure-resistance of the available reactors.

Emulsifiers and/or protective colloids in a quantity of 0.05–15 wt. %, preferably 1–10 wt. % in relation to 100 parts by weight of total monomers are used for emulsion polymerization.

Suitable emulsifiers are known to the person skilled in the art. They are disclosed for example in Houben-Weyl, Methoden der organischen Chemie, Vol. IX/1, Makromolekulare Stoffe, pages 192–208 and pages 411–420, Georg Thieme Verlag Stuttgart 1961. Cationic, anionic and non-ionic emulsifiers are suitable. Anionic emulsifiers are preferred. Suitable anionic emulsifiers are the salts of $C_8$–$C_{18}$ fatty acids and the corresponding dimerised fatty acids with alkali metals such as sodium, potassium and ammonium and also with volatile amines, such as triethyl amine, diethanol amine, triethanol amine etc. Further suitable anionic emulsifiers are for example alkali- and ammonium salts of alkyl sulfates, alkyl sulfonates and alkylaryl sulfonates having $C_8$–$C_{22}$-alkyl groups, modified resin acids such as disproportioned hydrogenated and dimerised resin acids, and also ethoxylated alkanols and ethoxylated alkyl phenols with degrees of ethoxylation of 2–50. Preferred emulsifiers are the Na and K-salts of disproportioned resin acids, the Na- and K-salts of palmitic, steric and oleic acids, alkyl sulfonates and also non- or partially hydrogenated tallow fatty acids.

Suitable protective colloids can be found in Houben-Weyl, Methoden der organischen Chemie, Vol. IX/1, Makromolekulare Stoffe, pages 192–208 and pages 411–420, George Thieme Verlag, Stuttgart 1961. Phenol and naphthaline sulfonic acid-formaldehyde-condensates such as e.g. Baykanol® PQ from Bayer AG or the Tamol® brands from BASF are preferred. Suitable quantities are 0.1–2 wt. % in relation to 100 wt. % of the total quantity of monomers.

All compounds that decompose into radicals under polymerization conditions can be used as radical initiators, such as e.g. peroxides, hydroperoxides, hydrogen peroxides, persulfates, perphosphates and azo compounds. Suitable organic peroxides are disclosed in EP-A 536 597. Hydrogen peroxide, Na-, K- and ammonium salts of peroxodisulfate, p-methane hydroperoxide, t-butylhydro-peroxide are particularly suitable. The stated radical initiators are used in quantities of 0.01 to 5, preferably 0.1 to 3.0 wt. % in relation to the total quantity of monomers.

By combining the stated radical formers with suitable reducing agents, so-called redox systems or redox catalysts are obtained, which allow a reduction in the temperature at which these radical formers are successfully used, for example to 5–30° C.

Suitable reducing agents are amines such as di-ethanol amine, tri-ethanol amine, di-n-butyl amine, tri-n-butyl amine, dithiocarbamates such as dimethyl dithiocarbamate, di-n-butyl dithiocarbamate, di-n-propyl dithiocarbamate, xanthogenates such as ethylxanthogenate, butylxanthogenate, hexylxanthogenate, 2-ethyl-hexyl-xanthogenate, dithionite, sulfite, bisulfite, thiosulfite, hydrazine, hydroxylamine, hydroquinone, perthiocarbonate, ascorbic acid, glucose, sorbose, hydroxylamine, acetone bis sulfite adducts and salts of hydroxymethane sulfinic acid such as e.g. Rongalit® C from BASF.

When using redox catalysts, it is useful to use additionally water-soluble salts of transitional metals such as iron, cobalt, nickel, silver and vanadium, usefully in combination with suitable complex formers such as ethylene diamine tetraacetic acid and nitrilo triacetic acid, so that the metal salts are provided dissolved in an aqueous alkaline milieu. Preferred redox systems are P-methane hydroperoxide/hydroxymethane sulfinate/Fe(II)sulfate (complexed with nitrilo triacetic acid), K-peroxodisulfate/tri-ethanol amine/Fe(II)sulfate (complexed with nitrilo triacetic acid), K-peroxodisulfate/ascorbic acid/Fe(II)sulfate (complexed with nitrilo triacetic acid).

Furthermore, so-called chain-transfer agents to regulate the molar weight are used. These regulators frequently also have an activating effect on the radical formers mentioned previously. Aliphatic, straight-chain or branched-chain mercaptans in a quantity of 0.05–2 wt. % are preferred.

The solids content of the dispersion is 5–60 wt. %, preferably 10–50 wt. %.

Optionally, it may be necessary to form the aqueous dispersion of the rubber particles following polymerization so that it is largely free of odor carriers such as residual monomers and other organic volatile constituents. This can be done in the known way physically, by removal by distillation (for example by steam distillation) or by feeding through an inert gas e.g. nitrogen and also chemically by after-polymerization, through the effects of redox initiators.

The subsequent modification produces the modified rubber gels by crosslinking the rubbers which form the basis of the gels in the known way, preferably in aqueous dispersion and, after achieving the desired degree of crosslinking, reacting or modifying the rubber gels obtained with the secondary amino-(meth)-acrylic acid esters of formula (I).

The previously mentioned type of crosslinking of the rubber particles from the base rubbers is known in principle and disclosed for example in U.S. Pat. Nos. 5,395,891 and 6,127,488.

The modification of rubber gels is also known and disclosed for example in the German patent applications Nos. 199 19 459.9, 10038488.9 and 10039749.

The crosslinked rubber gels modified by secondary amino-(meth)-acrylate groups according to the present invention can be based on first reacting the rubber that forms the basis as a latex with a compound that has a crosslinking action on the un- or slightly-crosslinked rubber. This reaction is preferably carried out on a rubber that is present in aqueous dispersion (latex). The crosslinked rubber-latex obtained is then reacted with the secondary amino-(meth)-acrylic acid ester in the presence of a radical former and once the reaction is complete, the modified rubber gel is obtained.

The following compounds are conventionally used to crosslink the rubbers gels: organic peroxides such as dicumyl peroxide, t-butylcumyl peroxide, bis-(t-butyl-peroxoisopropyl)-benzene, di-t-butyl peroxide, dibenzoyl peroxide, bis-/2,4-dichloro-benzoyl peroxide, t-butyl perbenzoate, organic azo compound such as azo-bis-isobutyl nitrile (AIBN), azo-bis-divaleronitrile, azo-bis-cyclohexane nitrile and dimercapto or polymercapto compounds such as 1,2-dimercapto ethane, 1,6-dimercapto hexane, 1,3,5-trimercapto triazine and mercapto-terminated polysulfide rubbers such as mercapto-terminated reaction products of bischloroethyl formal with sodium polysulfide. The temperature for the crosslinking reaction depends on the reactivity of the crosslinking agent used and is in the range of room temperature 20 to 180° C. When using dicumyl peroxide the reaction is carried out in the range 140° C. to 190° C., 150° C. to 170° C. being preferred. The times depend on the half lives for decomposition of the corresponding radical formers, 4–8 half-lives being normally used as the basis for the corresponding temperatures. The reaction temperature is usefully increased after 4–8 half-lives to ensure quantitative conversion.

When grafting the crosslinked rubber gels, latices are used as a basis, the desired quantity of amino-(meth)acrylate to latex being added in the first step and polymerization being carried out by the addition of a radical former.

The radical formers previously mentioned in connection with "direct polymerization", in particular the stated "redox systems" are used as radical formers.

The present invention further provides the use of modified rubber particles/gels according to the present invention for the production of rubber vulcanizates, which are obtained by a corresponding crosslinking reaction (vulcanization) with the known crosslinking- (or vulcanization) agents, preferably in combination with polyfunctional sulfonyl azides and are used for the production of molded bodies of all kinds, such as for the production of tires and tire components, and also of industrial rubber articles and golf balls.

When using the rubber gels according to the present invention to produce rubber vulcanizates or rubber molded bodies, the corresponding rubber blends are first produced, which contain, as well as the modified rubber particles according to the invention, as yet un-crosslinked rubbers containing double bonds, which are designated R-rubbers according to DIN/ISO 1629 and have a double bond in the main chain. These include, for example:

NR: natural rubber
SBR: styrene/butadiene rubber
BR: polybutadiene rubber
NBR: nitrile rubber
IIR: butyl rubber
BIIR: brominated isobutylene/isoprene-copolymers with bromine contents of 0.1–10 wt. %

CIIR: chlorinated isobutylene/isoprene copolymers with a chlorine content of 0.1–10 wt. %
HNBR: hydrogenated or partially hydrogenated nitrile rubbers
SNBR: styrene/butadiene/acrylonitrile rubbers
CR: polychloroprene
ENR: epoxidated natural rubbers or mixtures thereof
X-NBR: carboxylated nitrile rubbers
X-SBR: carboxylated styrene-butadiene copolymers Rubbers containing double-bonds should also be understood to include the rubbers that are designated M-rubbers according to DIN/ISO 1629 and that have, in addition to the saturated main chain, double bonds in the side chains. These include e.g. EPDM.

To produce rubber vulcanizates or rubber molded bodies according to the present invention those rubber mixtures preferably are used, that consist of non-crosslinked rubbers containing double-bonds of the type described (blend component I) and of crosslinked rubber particles, modified according to the present invention with amino(meth)acrylates (blend component II), the proportion of the rubber gels contained in the blend being 1 to 150 parts by weight, preferably 5 to 70 parts by weight, and the proportion of un-crosslinked rubbers containing double-bonds being 100 parts by weight.

The rubber blends may of course contain the known rubber auxiliary substances and fillers. Suitable fillers for the production of rubber mixes or vulcanizates are e.g.

Carbon blacks. The carbon blacks to be used here are produced by the lampblack, furnace black or gas black process and have BET surface areas of 20–200 m²/g such as e.g. SAF-, ISAF-, IISAF-, HAF-, FEF- or GPF blacks.

highly-disperse silica, produced e.g. by precipitation from solutions of silicates or flame hydrolysis of silicon halides with specific surface areas of 5–1000, preferably 20–400 m²/g (BET-surface area) and primary particle sizes of 5–400 nm. The silicas can optionally also be present as mixed oxides with other metal oxides, such as Al—, Mg—, Ca—, Ba, Zn— and Ti oxides.

synthetic silicates, such as aluminum silicate, earth alkali silicates, such as magnesium silicate or calcium silicate with BET surface areas of 20–400 m²/g and primary particle diameters of 5–400 nm.

natural silicates, such as kaolin and other naturally occurring silicas.

metal oxides, such as zinc oxide, calcium oxide, magnesium oxide, aluminum oxide.

metal carbonates, such as calcium carbonate, magnesium carbonate, zinc carbonate.

metal sulfates such as calcium sulfate, barium sulfate.

metal hydroxides such as aluminum hydroxide and magnesium hydroxide.

glass fibers and glass fiber products (slats, strands or micro beads).

Thermoplastic fibers (polyamide, polyester, aramide).

The fillers can be used in quantities of 0.1 to 100 parts by weight in relation to 100 parts by weight of the non-crosslinked double bond-containing rubber component.

The stated fillers can be used alone or in mixture with each other.

Rubber blends that contain 5 to 100 parts by weight of crosslinked rubber particles according to the present invention, 0.1 to 100 parts by weight carbon black and/or 0.1 to 100 parts by weight of so-called light fillers of the above-mentioned type, in each case in relation to 100 parts by weight of un-crosslinked rubber component, are preferred. When using a mixture of carbon black and light fillers, the quantity of fillers here is a maximum of ca 150 parts by weight.

As mentioned, the rubber blends can contain other rubber auxiliary substances, such as crosslinkers, vulcanization accelerators, anti-ageing agents, heat stabilizers, light stabilizers, ozone protection agents, processing auxiliary substances, plasticizers, tackifiers, blowing agents, dyes, pigments, wax, extenders, organic acids, inhibitors, metal oxides and filler activators, such as triethanol amine, polyethylene glycol, hexane triol, bis-(triethoxysilylpropyl)-tetrasulfide. The rubber auxiliary substances are disclosed for example in J. van Alphen, W. J. K. Schönbau, M. van Tempel Gummichemikalien, Berliner Union GmbH Stuttgart 1956 (whole book) and in Handbuch für die Gummiindustrie, Bayer A G, 2$^{nd}$ edition, 1991, p. 353–620.

The rubber auxiliary substances are used in the conventional quantities, which depend, among other things, on the intended use. Conventional quantities are, for example, 0.1 to 50 parts by weight in relation to 100 parts by weight of un-crosslinked rubber.

In addition, the rubber blends according to the present invention can contain further conventional crosslinkers such as sulfur, sulfur-providers, peroxides or other crosslinking agents, such as diisopropenyl benzene, divinyl benzene, divinyl ether, divinyl sulfone, diallyl phthalate, triallyl cyanurate, triallyl isocyanurate, 1,2-polybutadiene, N,N'-m-phenylene bismaleinimide and/or triallyl trimellitate. The acrylates and methacrylates of polyfunctional, preferably 2 to 4-valent $C_2$- to $C_{10}$-alcohols, such as ethylene glycol, propane diol-1,2, butane diol, hexane diol, polyethylene glycol containing 2 to 20, preferably 2 to 8 oxyethylene units, neopentyl glycol, bisphenol A, glycerine, trimethylol propane, pentaerythritol, sorbitol containing unsaturated polyesters of aliphatic di- and polyols and also maleic acid, fumaric acid and/or itaconic acid may also be considered.

The following are preferably used as crosslinkers: sulfur and sulfur-providers in the known quantities, for example in quantities of 0.1 to 10 parts by weight, preferably 0.1 to 5 parts by weight, in relation to 100 parts by weight of un-crosslinked rubber component.

The rubber blends according to the present invention can, in addition, also contain vulcanization accelerators of the known type, such as mercaptobenzothiazols, mercaptosulfenamides, guanidine, thiurams, dithiocarbamates, thioureas, thiocarbonates and/or dithiophosphates. Like the crosslinkers, the vulcanization accelerators are used in quantities of 0.1 to 10 parts by weight, preferably 0.1 to 5 parts by weight, in relation to 100 parts by weight of un-crosslinked rubber component.

When vulcanizing rubber blends containing the rubber particles modified according to the present invention, the addition of multifunctional sulfonyl azides as a further crosslinking agent has proved suitable.

Compounds of the general formula (II)

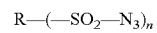

$$R\text{—}(\text{—}SO_2\text{—}N_3)_n \qquad (II)$$

may be considered as multifunctional sulfonyl azides, wherein

R stands for an aliphatic, araliphatic or aromatic, preferably for an aromatic group, wherein the aliphatic group contains 1 to 12 carbon atoms, the araliphatic group contains 7 to 20 carbon atoms and the aromatic group contains 6 to 36 carbon atoms and can be interrupted by ether-, thioether-, sulfone-, ketone-, C=C or ester bridges or nitrogen atoms, and wherein R may be substituted by halogen atoms, ester groups, alkoxy groups or aryloxy groups, wherein the ester groups, the alkoxy groups or the aryloxy groups may contain 1 to 36 carbon atoms, and n stands for a natural number from 2 to 4, preferably for 2.

The group R preferably stands for a phenylene group, a naphthalene group or an oxbisphenylene group.

Examples of the functional sulfonyl azides of the above formula (II) are: 1,3-bisazido sulfanyl benzene, 4,4'-bisazido sulfonyl diphenyl ether, 4,4'-bisazido sulfonyl biphenyl, bisazido sulfonyl naphthaline in all possible substitution patterns, 4,4'-bisazido sulfonyl benzofuran, 4,4'-bisazido sulfonyl diphenyl sulfide, 4,4'-bisazido sulfonyl dibenzothiophene, 4,4'-bisazido sulfonyl stilbene, trisazido sulfonyl naphthaline in all possible substitution patterns and also 2,4,2',4'-tetrakisazido sulfonyl diphenyl ether, 1,3-bisazido sulfonyl benzene and 4,4'-bisazido sulfonyl diphenylether being preferred.

The polysulfonyl azides according to the present invention of the above formula (II) are synthesized e.g. by reacting an equivalent of the corresponding base sulfonic acid halide with 1 to 10, preferably with 1.1 to 3, equivalents of an alkali metal azide such as sodium azide ($NaN_3$), lithium azide ($LiN_3$) or potassium azide ($KN_3$). In a preferred embodiment the solution of the sulfonic acid halide is added drop-by-drop in a water-soluble, organic solvent, such as acetone, THF, dioxane, NMP, DMF, DMA, glymes and/or diglymes, to a solution of an alkali metal azide in water and the precipitated product is isolated by filtration.

The multifunctional sulfonyl azides are generally used in the rubber blends disclosed above in quantities of 0.1 to 10 parts by weight, preferably 0.5 to 7 parts by weight, in relation to 100 parts by weight of un-crosslinked rubber.

The rubber blends disclosed may be produced in the known way, for example by mixing the solid individual components in suitable machinery such as rollers, internal mixers or mixer/extruders. The individual components are normally mixed with each other at mixing temperatures of 20 to 150° C.

The rubber blends may also be produced by mixing the rubber gels in latex form from the latices of the un-crosslinked rubber component and the other components into the latex mixture and then working it up by conventional operations such as evaporation, precipitation or freeze-coagulation.

The aim, when producing the rubber mixture, is above all to mix the blend components thoroughly with each other and to achieve good dispersion of the fillers used in the rubber matrix.

When using multifunctional sulfonyl azides of the above formula (II), as additional crosslinking agents in the rubber blends, the sulfonyl azide is preferably added at the end of the mixing cycle, at mixing temperatures that should lie below 50° C.

The rubber molded bodies or rubber vulcanizates produced from the crosslinked rubber particles according to the present invention modified by secondary amino-(meth)-acrylate groups have improved mechanical properties, above all an improvement in the product of tensile modulus at 300% elongation and elongation at break ($\sigma_{300} \times \epsilon_b$), in particular when multifunctional sulfonyl azides are used for crosslinking in addition to the conventional chemicals for sulfur crosslinking and that in silica-containing blends, the quantity of bis-(triethoxysilyl-propyl-3)-tetrasulfide is reduced by using multifunctional sulfonyl azide without losses in the product $\sigma_{300} \times \epsilon_b$ and also that the vulcanizing time is reduced.

The invention is further illustrated but is not intended to be limited by the following examples in which all parts and percentages are by weight unless otherwise specified.

EXAMPLES

Production of 1,3-bisazido sulfonyl benzene
(1,3-benzene disulfonic acid diazide)

The solution of 400 g 1,3-benzene disulfonic acid dichloride in 1.2 l acetone was added drop-by-drop to a solution of 380 g sodium azide in 1.2 l water at room temperature within 2 h. This was allowed to stand at room temperature for 24 h and the precipitated product was filtered off and dried in a high vacuum at room temperature. 396 g of the product was obtained. The structure was confirmed by elementary analysis (C: 24.8%, H: 1.3%, N: 29.1%, S: 22.3% and C 10.26%).

Characteristic data for the gels used are summarized in the following table:

| Gel OBR | Gel type | DCP[2] [phr] | Diameter $\bar{d}_z$[3] [nm] | Gel content [%] | QI[4] | Tg[5] [° C.] | Type of modification |
|---|---|---|---|---|---|---|---|
| 1135 | BR[1] | 2.5 | 120 | 97.8 | 3.7 | −42 | Unmodified |
| 1131C | BR[1] | 2.5 | 114 | 96.4 | 4.8 | −39.5 | 'BAEMA[6] (5 phr) |
| 1137 | BR[1] | 2.5 | 119 | 96.7 | 3.8 | −44 | 'BAEMA[6] (5 phr) |

[1]Polybutadiene
[2]Dicumyl peroxide
[3]The particle diameter is measured by ultracentrifugation (W. Scholtan, H. Lange, "Bestimmung der Teilchengröβenverteilung von Latices mit der Ultrazentrifuge", Kolloid-Zeitschrift und Zeitschrift für Polymere (1972) Volume 250, Issue 8). The diameter $\bar{d}_z$ is defined to DIN 53 206 as the median or central value, above and below which half of all the particle sizes lie.
[4]Swelling index
[5]Glass transition temperature
[6]2-(tert-butylamino)-ethyl methacrylate The rubber latices are crosslinked with dicumyl peroxide (DCP) to produce the BR gels OBR 1135, 1131 C and 1137 as disclosed in U.S. Pat. No. 5,395,891, using 2.5 phr DCP in each case.

The gels OBR 1131 C and OBR 1137, crosslinked with DCP, are grafted with 5 phr+BAEMA as in DE 199 459.9, gel designation 1b, "Pfropfung der in Latexform vorliegenden Kautschuke", t-BAEMA (2-(tert.-butylamino)-ethyl methacrylate being used instead of hydroxyethyl methacrylate (HEMA).

The gels OBR 1135, 1131 C and 1137 were stabilized and worked up as disclosed in DE 199 459.9, point 1c, "Stabilisierung und Aufarbeitung der hydroxyl-modifizierten Mikrogele".

The following blends were produced on the basis of the above-mentioned gels and the properties of the corresponding vulcanizates were determined:

Blend Series A:

The following components were mixed in the order given in an internal mixer, the temperature being maintained at 160° C. for 5 minutes towards the end of the mixing cycle:

| | Blend no. | | | |
|---|---|---|---|---|
| | 1 | 2 | 3 | 4 |
| TSR masticated natural rubber[1] | 100 | 100 | 100 | 100 |
| OBR 1131 C | — | — | 30 | 30 |
| Stearic acid | 3 | 3 | 3 | 3 |
| Zinc oxide | 3 | 3 | 3 | 3 |
| Ozone-protecting wax[2] | 1.5 | 1.5 | 1.5 | 1.5 |
| IPPD[3] | 1 | 1 | 1 | 1 |
| TMQ[4] | 1 | 1 | 1 | 1 |
| Enerthene 1849-1[5] | 3 | 3 | 3 | 3 |
| After cooling the blend the following compound components were mixed in on a roller at <50° C.: | | | | |
| Sulfur | 1.6 | 1.6 | 1.6 | 1.6 |
| Vulkacit NZ[6] | 2 | 2 | 2 | 2 |
| Multifunctional sulfonyl azide[7] | — | 2.5 | — | 2.5 |

[1] TSR 5, Defo 700
[2] Mixture of paraffins and micro-waxes (Antilux ® 654 from Rheinchemie Rheinau GmbH)
[3] N-isopropyl-N'-phenyl-p-phenylene diamine (Vulkanox ® 4010 NA from Bayer AG)
[4] 2,2,4-trimethyl-1,2-dihydroquinoline (polym.) Vulkanox ® HS from Bayer AG
[5] Plasticizer based on mineral oil (Enerthene ® 1849-1 from BP Oil GmbH)
[6] N-tert.butyl-2-benzothiazyl sulfenamide (Vulkacit NZ ® from Bayer AG)
[7] 1,3-benzene disulfonic acid diazide (KBD 9508).

The vulcanization behavior of the blends were analyzed in a rheometer at 160° C. to DIN 53 529 using the Monsanto rheometer MDR 2000E. Characteristic data such as $F_a$, $F_{max}$, $F_{max} - F_a$, $t_{10}$, $t_{50}$, $t_{90}$ and $t_{95}$ were measured in this way.

| | Blend no.: | | | |
|---|---|---|---|---|
| | 1 | 2 | 3 | 4 |
| $F_a$ [dNm] | 0.66 | 0.81 | 0.88 | 1.07 |
| $F_{max}$ [dNm] | 8.16 | 7.26 | 11.68 | 10.67 |
| $F_{max} - F_a$ [dNm] | 7.50 | 6.45 | 10.80 | 9.60 |
| $t_{10}$ [min.] | 5.02 | 0.68 | 7.73 | 0.71 |
| $t_{50}$ [min.] | 5.86 | 5.75 | 8.9 | 7.27 |
| $t_{90}$ [min.] | 8.73 | 7.13 | 11.85 | 9.02 |

The following meanings are according to DIN 53 529, Part 3:
$F_a$: vulcameter reading at minimum crosslinking isothermie
$F_{max}$: maximum vulcameter reading
$F_{max}-F_a$: difference between minimum and maximum vulcameter readings
$t_{10}$: time at which 10% conversion is achieved
$t_{50}$: time at which 50% conversion is achieved
$t_{90}$: time at which 90% conversion is achieved
$t_{95}$: time at which 95% conversion is achieved The blends were vulcanized in a press under a hydraulic pressure of 120 bar at 160° C. The heating times for the various compounds are shown in the attached table:

| | Blend no.: | | | |
|---|---|---|---|---|
| | 1 | 2 | 3 | 4 |
| Heating time [min] | 14 | 14 | 17 | 15 |

The following test values were measured on the vulcanizates:

| | Blend no.: | | | |
|---|---|---|---|---|
| | 1 | 2 | 3 | 4 |
| Tensile strength ($\sigma_{max}$) DIN 53504 [MPa] | 19.7 | 1.5 | 27.6 | 26.4 |
| Elongation at break ($\epsilon_b$) DIN 53504 [%] | 609 | 193 | 633 | 573 |
| Tensile modulus at 25% elongation ($\sigma_{25}$) to DIN 53504 [MPa] | 0.64 | 0.75 | 0.93 | 0.57 |
| Tensile modulus at 100% elongation ($\sigma_{100}$) to DIN 53504 [MPa] | 0.94 | 1.05 | 1.39 | 1.52 |
| Tensile modulus at 200% elongation ($\sigma_{200}$) to DIN 53504 [MPa] | 1.51 | 1.49 | 2.90 | 3.51 |
| Tensile modulus at 300% elongation ($\sigma_{300}$) to DIN 53504 [MPa] | 2.36 | 2.33 | 5.67 | 7.32 |
| Shore A hardness, 23° C. DIN 53505 | 40.5 | 42.1 | 50.7 | 52.0 |
| Shore A hardness, 70° C. DIN 53505 | 40.5 | 40.0 | 48.0 | 48.5 |
| Impact resilience, 23° C. ($R_{23}$) DIN 53512 [%] | 78 | 73.9 | 61.3 | 64.2 |
| Impact resilience 70° C. ($R_{70}$) DIN 53512 [%] | 81.9 | 81.3 | 72.5 | 74.1 |
| $\sigma_{300} \times \epsilon_b$ [MPa × %] | 1437 | 450 | 3589 | 4194 |

Result:

Blend series A shows that the addition of the gel according to the present invention improves the mechanical properties $\sigma_{25}$, $\sigma_{100}$, $\sigma_{200}$, $\sigma_{300}$, $\sigma$max., $\epsilon_b$ and the product of the tensile modulus at 300% elongation and the elongation at break ($\sigma_{300} \times \epsilon_b$). In addition, the processing safety ($t_{10}$) is improved. (Blend no. 1 and 3). A comparison of blends 3 and 4 also shows that by combining the gel according to the present invention with multifunctional sulfonyl azides, a further improvement of the product $\sigma_{300} \times \epsilon_b$ is achieved and that the vulcanizing time ($t_{90}$) is reduced.

Blend Series B

The following components were mixed in the stated order in an internal mixer, the temperature being maintained at 160° C. for 5 minutes towards the end of the mixing cycle:

| | Blend No.: | | | | | |
|---|---|---|---|---|---|---|
| | 1 | 2 | 3 | 4 | 5 | 6 |
| TSR 5 | 100 | 100 | 100 | 100 | 100 | 100 |
| OBR 1135 | — | — | 30 | 30 | — | — |
| OBR 1137 | — | — | — | — | 30 | 30 |
| Stearic acid | 3 | 3 | 3 | 3 | 3 | 3 |
| Zinc oxide | 3 | 3 | 3 | 3 | 3 | 3 |
| Antilux 654 | 1.5 | 1.5 | 1.5 | 1.5 | 1.5 | 1.5 |
| Vulkanox 4010 | 1 | 1 | 1 | 1 | 1 | 1 |
| Vulkanox HS | 1 | 1 | 1 | 1 | 1 | 1 |
| Enerthene 1849-1 | 3 | 3 | 3 | 3 | 3 | 3 |

The following components were mixed into the blend, which had been cooled to <50° C. on a roller:

|  | Blend No.: | | | | | |
|---|---|---|---|---|---|---|
|  | 1 | 2 | 3 | 4 | 5 | 6 |
| KBD 9508 | — | 5 | — | 5 | — | 5 |
| Sulfur | 1.6 | 1.6 | 1.6 | 1.6 | 1.6 | 1.6 |
| Vulkacit NZ | 2 | 2 | 2 | 2 | 2 | 2 |

The vulcanization behavior of the blends was analyzed in a rheometer at 160° C. to DIN 53 329 using a Monsanto rheometer MDR 2000E. Characteristic data such as $F_a$, $F_{max}$, $F_{max}-F_a$, $t_{10}$, $t_{50}$, $t_{90}$ and $t_{95}$ were measured in this way.

|  | Blend no.: | | | | | |
|---|---|---|---|---|---|---|
|  | 1 | 2 | 3 | 4 | 5 | 6 |
| $F_a$ [dNm] | 0.2 | 0.3 | 0.4 | 0.5 | 0.4 | 0.4 |
| $F_{max}$ [dNm] | 7.4 | 6.9 | 11.6 | 7.4 | 11.4 | 9.4 |
| $F_{max} - F_a$ [dNm] | 7.2 | 6.6 | 11.2 | 6.9 | 11.0 | 9.0 |
| $t_{10}$ [min.] | 5.2 | 0.7 | 7.4 | 0.6 | 5.4 | 0.6 |
| $t_{80}$ [min.] | 7.2 | 4.2 | 10.6 | 1.7 | 7.8 | 4.1 |
| $t_{90}$ [min.] | 8.4 | 4.6 | 12.4 | 2.0 | 9.2 | 4.5 |
| $t_{95}$ [min.] | 9.6 | 4.9 | 14.3 | 6.6 | 10.6 | 4.8 |

The blends were vulcanized in a press under a hydraulic pressure of 120 bar at 160° C. The heating times for the various blends were determined according to the $t_{95}$ times. The following test values were measured on the vulcanizates:

|  | Blend no.: | | | | | |
|---|---|---|---|---|---|---|
|  | 1 | 2 | 3 | 4 | 5 | 6 |
| Tensile strength ($\sigma_{max}$) DIN 53504 [MPa] | 18.4 | 2.1 | 28 | 9.4 | 27.1 | 22.1 |
| Elongation at break ($\epsilon_b$) DIN 53504 [%] | 630 | 225 | 660 | 335 | 660 | 505 |
| Tensile modulus at 25% elongation ($\sigma_{25}$) to DIN 53504 [MPa] | 0.5 | 0.6 | 0.9 | 1.0 | 0.8 | 1.1 |
| Tensile modulus at 100% elongation ($\sigma_{100}$) to DIN 53504 [MPa] | 0.8 | 1.0 | 1.4 | 1.6 | 1.3 | 1.8 |
| Tensile modulus at 200% elongation ($\sigma_{200}$) to DIN 53504 [MPa] | 1.3 | 1.8 | 2.9 | 3.6 | 2.7 | 4.2 |
| Tensile modulus at 300% elongation ($\sigma_{300}$) to DIN 53504 [MPa] | 2.0 |  | 5.4 | 6.6 | 5.2 | 8.5 |
| Shore A hardness, 23° C. (DIN 53505) | 40 | 45 | 52 | 57 | 51 | 55 |
| Shore A hardness, 70° C. (DIN 53505) | 41 | 44 | 48 | 52 | 48 | 52 |
| Impact resilience, 23° C. ($R_{23}$) DIN 53512 [%] | 75 | 74 | 59 | 64 | 60 | 64 |
| Impact resilience, 70° C. ($R_{70}$) DIN 53512 [%] | 87 | 85 | 72 | 75 | 72 | 74 |
| $\sigma_{300} \times \epsilon_b$ [MPa x %] | 1260 | — | 3564 | 2211 | 3432 | 4293 |

Result:

Blend series B shows that in contrast to the combination of unmodified gel with multifunctional sulfonyl azide (blends 3 and 4), combinations of the gel according to the present invention with multifunctional sulfonyl azide (blends 5 and 6) improve the product of tensile modulus at 300% elongation and elongation at break ($\sigma_{300} \times \epsilon_b$) and also reduce the vulcanizing time ($t_{95}$).

Blend Series C

The following components were mixed in the order given in an internal mixer, the temperature being maintained at 160° C. for 3 minutes towards the end of the mixing cycle.

|  | Blend No.: | | |
|---|---|---|---|
|  | 1 | 2 | 3 |
| TSR 5 | 100 | 100 | 100 |
| Silica[9] | 40 | 40 | 40 |
| Carbon black N 330 | 2 | 2 | 2 |
| Si 69[10] | 6 | 6 | 3.2 |
| Enerthene 1849-1 | 5 | 5 | 5 |
| Zinc oxide | 5 | 5 | 5 |
| Stearic acid | 3 | 3 | 3 |
| Vulkanox HS | 1 | 1 | 1 |
| Vulkanox 4010 | 0.75 | 0.75 | 0.75 |

The following components were mixed into the blend, which had been cooled to <50° C. on a roller:

| OBR 1137 | 35 | 35 | 35 |
| Sulfur | 2.8 | 2.8 | 2.8 |
| Vulkacit NZ | 2 | 2 | 2 |
| Vulkacit D[11] | 0.8 | 0.8 | 0.8 |
| KBD 9508 | — | 2.5 | 2.5 |

[8]Silica (Type VN 2 from Degussa AG)
[9]Carbon black (Type N 330 from Degussa AG)
[10]Bis-(triethoxysilyl-propyl-3)tetrasulfide (Si ® 69 from Degussa AG)
[11]Diphenyl guanidine (Vulkacit ® D from Bayer AG)

The vulcanization behavior of the blends was analyzed in a rheometer at 160° C. to DIN 53 529 using a Monsanto rheometer MDR 2000E. Characteristic data such as $F_a$, $F_{max}$, $F_{max}-F_a$, $t_{10}$, $t_{50}$, and $t_{90}$ were measured in this way.

|  | Blend no.: | | |
|---|---|---|---|
|  | 1 | 2 | 3 |
| $F_a$ [dNm] | 1.94 | 1.83 | 2.27 |
| $F_{max}$ [dNm] | 34.5 | 28.8 | 27.2 |
| $F_{max} - F_a$ [dNm] | 34.2 | 28.5 | 25.9 |

-continued

| | Blend no.: | | |
|---|---|---|---|
| | 1 | 2 | 3 |
| $t_{10}$ [min.] | 2.94 | 0.94 | 0.84 |
| $t_{80}$ [min.] | 6.79 | 5.59 | 5.08 |
| $t_{90}$ [min.] | 9.52 | 7.56 | 6.15 |
| $t_{95}$ [min.] | 12.2 | 9.8 | 7.4 |

The blends were vulcanized in a press under a hydraulic pressure of 120 bar at 160° C. The heating times for the various blends were determined according to the $t_{95}$ times. The following test values were measured on the vulcanizates:

| | Blend no.: | | |
|---|---|---|---|
| | 1 | 2 | 3 |
| Tensile strength ($\sigma_{max}$) DIN 53504 [MPa] | 14.1 | 18.3 | 21.6 |
| Elongation at break ($\epsilon_b$) DIN 53504 [%] | 195 | 258 | 334 |
| Tensile modulus at 50% elongation ($\sigma_{50}$) to DIN 53504 [MPa] | 3.4 | 3 | 2.7 |
| Tensile modulus at 100% elongation ($\sigma_{100}$) to DIN 53504 [MPa] | 6.4 | 6 | 5.3 |
| Tensile modulus at 200% elongation ($\sigma_{200}$) to DIN 53504 [MPa] | 14.5 | 13.9 | 12.6 |
| Tensile modulus at 300% elongation ($\sigma_{300}$) to DIN 53504 [MPa] | — | — | 19.7 |
| Shore A hardness, 23° C. (DIN 53505) | 79.9 | 77.2 | 76 |
| Shore A hardness, 70° C. (DIN 53505) | 76.7 | 72.7 | 71 |
| Impact resilience, 23° C. ($R_{23}$) DIN 53512 [%] | 46.7 | 48.4 | 48 |
| Impact resilience, 70° C. ($R_{70}$) DIN 53512 [%] | 64 | 65.5 | 66 |
| $\sigma_{200} \times \epsilon_b$ [MPa × %] | 2828 | 3586 | 4208 |

Result:

Blend series C shows that in a compound that contains the gel according to the present invention, silica and bis-(triethoxysilyl-propyl-3)-tetrasulfide, the addition of multifunctional sulfonazides brings about an improvement in tensile strength, elongation at break and the product of $\sigma_{300} \times \epsilon b$ and a reduction in the vulcanizing time ($t_{95}$) (blends 1 and 2) and also that the addition of multifunctional sulfonyl azides and a simultaneous reduction of the quantity of bis-(triethoxysilyl-propyl-3)-tetrasulfides, makes it possible to improve the product of $\sigma_{300} \times \epsilon_b$ and to reduce the vulcanizing time ($t_{95}$) still further.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Tires and tire components prepared by vulcanizing a rubber blend comprising rubber particles, wherein said rubber particles are crosslinked rubber particles modified by secondary amino-(meth)-acrylate groups, having a median particle diameter $\bar{d}_z$ of 5 to 500 nm, a swelling index in toluene of 1 to 25, a gel content of 80 to 100 wt. % and a quantity of secondary amino-(meth)-acrylate groups of 0.5 to 10 wt. % in relation to the total weight of the rubber particle.

2. Tires and tire components according to claim 1, wherein said crosslinked rubber particles have a median particle diameter $\bar{d}_z$ in the range of 10 to 500 nm, a swelling index in the range of 1 to 25, a gel content of 80 to 100 wt. % and a quantity of secondary amino-(meth)-acrylate groups of 0.5 to 10 wt. %.

3. Tires and tire components according claim 1, wherein said crosslinked rubber particles have a median particle diameter $\bar{d}_z$ in the range of 20 to 400 nm, a swelling index in the range of 1 to 15, a gel content of 90 to 100 wt. % and a quantity of secondary amino-(meth)-acrylate groups of 1 to 5 wt. %.

* * * * *